United States Patent
Shishido et al.

(10) Patent No.: US 12,189,696 B2
(45) Date of Patent: Jan. 7, 2025

(54) COMPUTER IMPLEMENTED METHOD FOR IMPROVING SEARCH ENGINE QUERIES

(71) Applicant: Dassault Systemes, Vélizy-Villacoublay (FR)

(72) Inventors: Moeka Shishido, Vélizy-Villacoublay (FR); Xavier Gréhant, Vélizy-Villacoublay (FR)

(73) Assignee: Dassault Systemes, Velizy-Villacoublay (FR)

( * ) Notice: Subject to any disclaimer, the term of this patent is extended or adjusted under 35 U.S.C. 154(b) by 319 days.

(21) Appl. No.: 17/644,955

(22) Filed: Dec. 17, 2021

(65) Prior Publication Data
US 2022/0197962 A1 Jun. 23, 2022

(30) Foreign Application Priority Data
Dec. 18, 2020 (EP) .................................... 20306626

(51) Int. Cl.
*G06F 40/284* (2020.01)
*G06F 16/9532* (2019.01)
*G06F 40/289* (2020.01)
*G06F 40/40* (2020.01)

(52) U.S. Cl.
CPC ........ *G06F 16/9532* (2019.01); *G06F 40/284* (2020.01); *G06F 40/289* (2020.01); *G06F 40/40* (2020.01)

(58) Field of Classification Search
CPC .. G06F 16/9532; G06F 40/284; G06F 40/289; G06F 40/40; G06F 16/3338; G06F 16/334; G06F 16/3344; G06F 40/253; G06N 20/00
See application file for complete search history.

(56) References Cited

U.S. PATENT DOCUMENTS

| | | | |
|---|---|---|---|
| 10,162,886 B2 * | 12/2018 | Wang | G06F 16/334 |
| 2015/0310114 A1 | 10/2015 | Ryger et al. | |
| 2017/0085509 A1 * | 3/2017 | Fernandez | H04L 51/046 |
| 2017/0286401 A1 * | 10/2017 | He | G06F 17/16 |

OTHER PUBLICATIONS

Search Report dated May 4, 2021 issued in corresponding European patent application No. 20306626.1 (9 pages).

* cited by examiner

*Primary Examiner* — Daniel C Washburn
*Assistant Examiner* — Penny L Caudle
(74) *Attorney, Agent, or Firm* — Oblon, McClelland, Maier & Neustadt, L.L.P.

(57) ABSTRACT

A computer implemented method for improving search engine queries including receiving a text corpus, determining a list of n-gram candidates, each being a series of consecutive words of said text corpus, the number of said consecutive words within said series being an integer n superior or equal to two, modifying at least partially said text corpus based on said list of n-gram candidates, performing a machine learning embedding on the resulting text corpus, for each element in said list of n-gram candidates, computing a score based on the embedding of said element and the embeddings of the words making up said element, adding one or more of the n-gram candidates to a search engine queries items list based on their respective scores.

16 Claims, 1 Drawing Sheet

COMPUTER IMPLEMENTED METHOD FOR IMPROVING SEARCH ENGINE QUERIES

CROSS-REFERENCE TO RELATED APPLICATIONS

This application claims priority under 35 U.S.C. § 119 or 365 to European Application No. EP20306626.1, filed Dec. 18, 2020. The entire contents of the above application are incorporated herein by reference.

FIELD

The disclosure concerns a computer implemented method for improving search engine queries.

BACKGROUND

The field of search engines is not limited to the crawling of the Internet. Search engines are becoming an increasingly important part of companies' information systems, especially for design and procurement purposes.

One of the problems with such search engines is that the need for precision of the searches is much more important than for general applications. In order to improve this precision, it is thus critical to establish a relevant vocabulary for the documents. One of the problems with establishing these vocabularies is that often times, the elements having the most important meanings are not single words but groups of words also known as phrases.

Indeed, in natural language, words are not exact units of meaning. This is because some words have multiple meanings (homonyms), and because some meanings are expressed with multiple words.

It is thus very important to be able to detect phrases within documents. Of course, this can all be done "by hand". But there is a significant bias associated to human indexing. Phrase detection is also necessary for (semi-)automated enrichment of knowledge graphs, thesauruses, taxonomies, ontologies, which involves suggesting or automatically adding words and phrases to the vocabulary, list of entities, concepts, and forms of occurrence.

The state of the art phrase detection technique is to use frequentist approaches to find n-grams that occur more often than by chance, an n-gram being a series of n consecutive words, n being an integer which cannot exceed the max number of words in the sentences of a given text.

This is conventionally done using hypothesis testing such as t-test or chi-square test or using Pointwise mutual information (PMI). The PMI is roughly proportional to the frequency of occurrence of the n-gram and inversely proportional to the product of the frequencies of occurrence of each token. It is reminded that the expression to tokenize means to separate a piece of text into smaller units. The way of tokenizing is language specific, but the most common is to split text based on space and punctuations.

The problems of using such frequentist approaches to detect new units of meaning in phrases is that frequentist approaches work for the most frequent expressions and expressions made with frequent words. This means that less frequent expressions or expressions made of less frequent words tend either to have incorrectly high or low scores. Also, these methods are subject to frequency biases. In other words, they make assumptions on the statistical distributions of occurrence of words that do not hold in many real-life corpuses. For example, the use of PMI to detect that groups of words occur more often than by chance relies on the hypothesis that word occurrences are independent and identically distributed. This is not true in general. In real world corpuses, some forms of speech are artificially frequent. For example, in Shakespeare's Hamlet, "Enter Horacio" is a frequent expression not because it is a unit of meaning, but because Hamlet is a play. In the domain of industrial components, one can think of the expressions "download part", "request price" or "download model", which are frequent in the description of part catalog, but do not carry a unit of meaning, as opposed to "passive component" or "linear integrated circuit".

This is also the case for most modern natural language processing techniques, which rely on the assumption that words are units of meaning. This is the case for word embeddings, and document vectorization (using bag of words vectorization but also recurrent networks, for instance).

There is thus a problem with automated phrase detection.

SUMMARY

The disclosure aims at improving the situation. To this end, the Applicant proposes a computer-implemented method for improving search engine queries comprising the following steps:
  a. receiving a text corpus,
  b. determining a list of n-gram candidates, each being a series of consecutive words of said text corpus, the number of said consecutive words within said series being an integer n superior or equal to two,
  c. modifying at least partially said text corpus based on said list of n-gram candidates,
  d. performing a machine learning embedding on the resulting text corpus,
  e. for each element in said list of n-gram candidates, computing a score based on the embedding of said element and the embeddings of the words making up said element,
  f. adding one or more of the n-gram candidates to a search engine queries items list based on their respective scores.

This method is advantageous because it allows for automated phrase detection which takes into account the case where two words or more form a new unit of meaning, i.e. words that do not individually contribute to the meaning of a text when placed in juxtaposition, but instead, their juxtaposition produces a single, new unit of meaning, by using embeddings. This is the case for instance for "ice cream" or "bottom line".

In various embodiments, the method may present one or more of the following features:
  step c. comprises parsing the text corpus with the list of n-gram candidates of step b., and each time a series of consecutive words of said text corpus make up a given element of said list of n-gram candidates, replacing said series of consecutive words by a token associated with the corresponding given element,
  step c. further comprises, upon identifying a series of consecutive words of said text corpus making up a given element of said list of n-gram candidates, determining whether one or more words consecutive to said series of consecutive words of said text corpus make up a different element of said list of n-gram candidates with one or more of the endmost words of said series of consecutive words of said text corpus, and, in such case, duplicating the series of consecutive words making up said different element and replacing said series of consecutive words by a token associated with said different element.

wherein step c. comprises copying the text corpus such that each word of the text corpus appears a number of times equal to the number of said consecutive words within said series being an integer n superior or equal to two, and parsing each copy of the text corpus by analyzing each sentence by series of consecutive words which number is the integer n superior or equal to two, each sentence of a copy being parsed with an offset, the offset being different for each copy, wherein step c. comprises parsing the text corpus with the list of n-gram candidates of step b., and each time a series of consecutive words of said text corpus make up a given element of said list of n-gram candidates, determining whether one or more words consecutive to said series of consecutive words of said text corpus make up a different element of said list of n-gram candidates with one or more of the endmost words of said series of consecutive words of said text corpus, and, in such case, using a pseudo-random function parametrized by the number of times the series of words making up said given element has already been replaced by the token associated with the corresponding given element within the part of the text corpus already parsed to compute a value determining whether the series of consecutive words making up said given element should be tokenized as a single word token or not, and applying the same processing to the series of consecutive words making up said different element, step e. comprises computing cosine distance or Euclidian distance between the embedding of said element and the embeddings of the words making up said element, the number of said consecutive words within said series is equal to two, and step e. comprises computing the maximum of the distance between the embedding of said element and the sum of the embeddings of the words making up said given element, and the distance between the embedding of said element and each separate embedding of the words making up said element, the number of said consecutive words within said series is equal to three, and step e. comprises computing the maximum of the distance between the embedding of said element and the sum of the embedding of two consecutive words of the words making up said given element and the embedding of remaining word making up said element, and step b. comprises using pointwise mutual information between words.

The disclosure also concerns a computer program comprising instructions for performing the method of the embodiments, a data storage medium having recorded thereon this computer program and a computer system comprising a processor coupled to a memory having recorded thereon this computer program of claim 10.

BRIEF DESCRIPTION OF THE DRAWINGS

Other features and advantages of the embodiments will readily appear in the following description of the drawings, which show exemplary embodiments and on which.

DETAILED DESCRIPTION

The drawings and the following description are comprised for the most part of positive and well-defined features. As a result, they are not only useful in understanding the disclosure, but they can also be used to contribute to its definition, should the need arise.

The description may make reference or use elements protected or protectable by copyright. The Applicant does not object to the reproduction of those elements in as much as it is limited to the necessary legal publications, however this should not be construed as a waiver of rights or any form of license.

Figure 1:
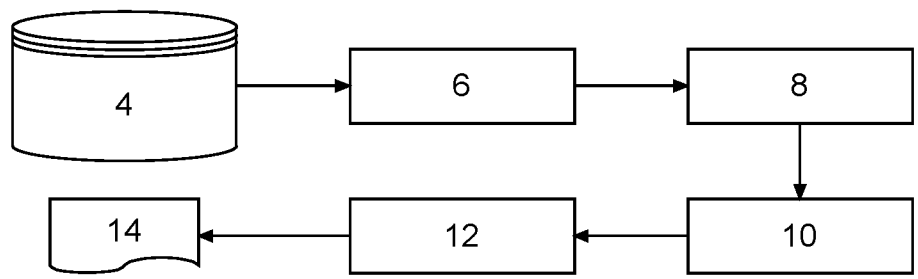
FIG. 1 shows a general diagram view of a system according to the embodiments.

FIG. 1 shows a general diagram view of a system according to the embodiments. The system 2 comprises a memory 4, a candidate detection unit 6, a corpus modifying unit 8, an embedding unit 10 and a scoring unit 12 which returns a list of detected phrases 14.

The memory 4 stores text corpus data for which phrase detection is sought, as well as any transitory data which may be generated in the course of executing the embodiments. Memory 4 may also store the list of detected phrases 14 after it has been determined.

In the example described herein, the memory 4 may be realized in any way suitable, that is by means of a hard disk drive, a solid-state drive, a flash memory, a memory embedded in a processor, a distant storage accessible in the cloud, etc.

In the example described herein, the candidate detection unit 6, the corpus modifying unit 8, the embedding unit 10 and the scoring unit 12 are computer programs which are executed on one or more processors. Such processors include any means known for performing automated calculus, such as CPUs, GPUs, CPUs and/or GPUs grids, remote calculus grids, specifically configured FPGAs, specifically configured ASICs, specialized chips such as SOCs or NOCs, AI specialized chips, etc.

The candidate detection unit 6 receives a text corpus in which phrase detection is sought from memory 4, and the resulting n-gram candidates are fed to the corpus modifying unit 8. The corpus modifying unit 8 modifies the text corpus in order to prepare the embedding of the words it contains and also to take into account possible overlaps between the n-gram candidates. Thereafter, the embedding unit 10 performs a machine learning embedding on the modified text corpus and returns embeddings for each unique word of the modified text corpus. Finally, the scoring unit 12 compares the embeddings between them to determine whether n-gram candidates indeed constitute new meanings or whether they are a simple juxtaposition of the words that make them up.

Figure 2:
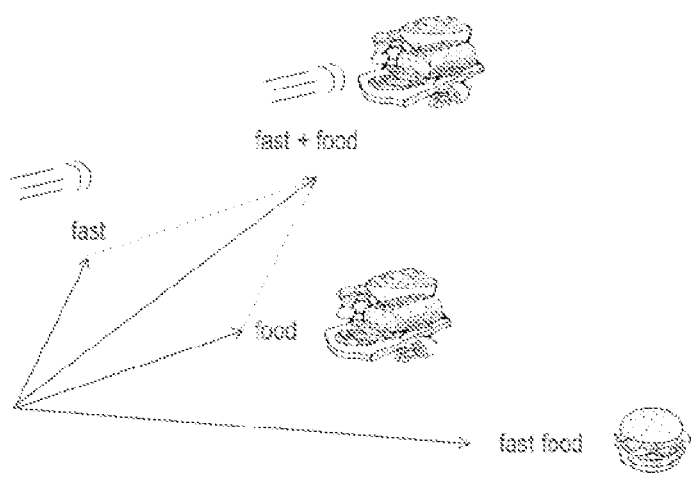
FIG. 2 shows the case of an expression "fast food" and the comparison to the paraphrase of the set of its words.

In order to exemplify the concept of the embodiments, FIG. 2 illustrates the case of an expression "fast food" which is not a paraphrase of the set of its words. "Fast food" is semantically different from food that is fast. The arrows on FIG. 2 relate to the embeddings which will be calculated for the respective expressions "fast", "food" and "fast food".

As it will appear below, the disclosure relies on the use of machine learning word embedding techniques such as word2vec, according to which, if the meaning juxtaposition of two words is the sum of their respective meanings, then the embedding of this juxtaposition will be approximately equal to the sum of the embeddings of the words within the juxtaposition. In the case of "fast food", because it does not designate food that is fast, the sum of the embeddings of "fast" and "food" will be different from the embedding of "fast food".

In the following, the embedding unit 10 will proceed on single word expressions. It is thus necessary to use the candidate detection unit 6 and the corpus modifying unit 8 in order to provide a modified text corpus in which the n-gram candidates are in single word form.

In order to determine the n-gram candidates, the candidate detection unit 6 may apply one or more of the following operations on the text corpus:

Split the text corpus into sentences to avoid n-grams that overlap multiple sentences, Split text corpus into noun chunks and verb chunks, Optionally, split text on stop words. This is useful for texts with approximate or incorrect grammar, but it may produce false negatives. Also phrases that contain the stop words, such as "proof of concept" or "at scale" will not be detected as a result. For clarity purposes, it is reminded that "stop words" are a set of extremely common words, such as articles (the, a) and prepositions (of, in at), which generally do not contribute much to the meaning of a text corpus. Still optionally, the text corpus could further be filtered with part-of-speech, that is the grammatical groups, such as noun, verb, and adjective, into which words are divided depending on their use.

Thereafter, the candidate detection unit 6 may use a state of the art collocation detection method, such as PMI, on each remaining text chunk using a permissive threshold. For instance, among all possible n-grams within the text corpus, it may select the n-grams having highest pointwise mutual information between the words. Not all possible n-grams will be retained, but candidate detection unit 6 may be arranged to select more n-grams than expected to be obtained in the list of phrases detected 14, for example 10, 100 or 1000 times more. This will temporarily allow false positives and avoid false negatives. In the context of the disclosure, false positives are n-grams which do not carry a meaning which is different than the addition of the meanings of the words which make up the n-gram, whereas false negatives are n-grams which are not detected as potential set of words carrying a specific meaning. The false positives will be discarded by the combined work of the embedding unit 10 and the scoring unit 12. For clarity purposes, it should be understood that the expression "words which make up the n-gram" means the words which put together constitute that n-gram. By way of example, if the n-gram is "New York City", the words making up this n-gram are "New", "York", and "City". Other than PMI, hypothesis testing such as t-test, chi-square test, frequency may also be used.

After the n-gram candidates have been identified by the candidate detection unit 6, it is necessary to modify the text corpus so that the n-gram candidates are seen as a single word by the embedding unit 10. This is done by the corpus modifying unit 8, which essentially performs two actions:

transform the n-gram candidates within the text corpus into single word tokens. This can be done for example by simply splitting tokens on white spaces, and replacing white space with a special character, such as an underscore, between the tokens of the n-grams candidates.

optionally replicate some or all of the text corpus to account for n-gram candidates overlap.

In order to explain the notion of n-gram candidate overlap, let us take the example of the expression "New York City". This expression contains the following plausible 2-grams "New York" and "York City" as well as the 3-gram "New York City". If the corpus modifying unit 8 functions in a candid manner, this expression will always be tokenized to "New York" and "city", which is not necessarily wanted.

In other words, when there exists an n-gram overlap, no replicating the expression will result losing some n-grams, that will either entirely disappear or not appear often enough to produce accurate embeddings. At the same, if one systematically duplicates these expressions, it will bias the embeddings by artificially repeating parts of the corpus.

The Applicant has identified several methods that can be used in order to duplicate expressions in order to take into account the n-grams overlap while limiting induced bias.

According to a first method, the full text corpus in replicated, and each sentence is parsed by groups of words of size equal to n (the integer of n-gram sought after). However, in each separate version of the corpus, the sentences will be parsed with an offset with respect to n and tokenize the parsed text by preserving n-grams found as single word tokens.

For example, if n is equal to 2, and the text corpus is "I will use anti lock brake systems.", the first version of the text corpus will be parsed as "I will" "use anti" "lock brake" 'systems", whereas the second version of the text corpus will be parsed as "will use" "anti lock" "brake systems". Given a n-gram candidates 'anti lock', 'lock brake', and 'brake systems', the first version of the text corpus will be tokenized as "I, will, use, anti, lock_brake, systems". The second version will be tokenized as "will, use, anti_lock, brake_systems".

Of course, the same will be done with other values of n, with offsets ranging from 0 to n minus 1.

This method is extremely advantageous because it is extremely simple to put in place and greatly limit the biasing. However, one could argue that the overlaps are at a disadvantage because the rest of the words of the text corpus are duplicated, but not the overlap n-grams.

According to a second method, the corpus modifying unit 8 may flatten the Pareto curve of n-gram frequencies. This second method redistributes unnecessarily frequent word occurrences to the n-grams they compose. It also duplicates content that contain rare, overlapping n-grams to limit the training bias while boosting training samples (chunks of text) with rare information (rare n-grams).

This method may be performed as follows:

select a target minimum number MIN of occurrences for a token to be properly embedded, parse the text corpus and count all possible occurrences of each n-gram candidate. For example, the expression «New York City» will count for occurrences of «New York «York City» and «New York City». After this count is performed, discard the n-gram candidates whose count COUNT is less than MIN, parse the text corpus again, and each time an occurrence of a given n-gram candidate is encountered in the absence of an overlap, tokenize it as a single word, increase a counter SELECT which indicates how many times this given n-gram candidate has been tokenized as a single word during the parsing, and decrease its count COUNT, Each time a sentence contains overlapping n-gram candidates, duplicate the sentence in the following way:

set an empty list KEEP for each n-gram being part of an overlap in the sentence, use a pseudo-random function to generate a number according to the uniform distribution between 0 and 1. If the score ((MIN-SELECT)/COUNT) exceeds the result random number, add the n-gram to the list KEEP While there are n-grams in the list KEEP, tokenize the sentence by preserving at least one n-gram of the list KEEP as a single word token (i.e., do not split the n-gram in multiple tokens), add the sentence to the text corpus, and remove from the list KEEP all n-grams that exist as a single token in the tokenized sentence.

For each occurrence of n-gram candidates added as single tokens in the resulting tokenized sentences: increase the counter SELECT by one, decrease the count COUNT by one.

In this method, duplication creates only a limited bias. A bias would be problematic if a small part of the text corpus was artificially duplicated many times. On the contrary, this method duplicates chunks that contain rare n-grams. Since n-gram frequencies roughly follow a Pareto distribution, it will produce few duplicates of most of the chunks.

After the text corpus has been modified to tokenize all of the n-gram candidates as per one of the above methods, the embedding unit 10 is called to perform an embedding of all of the tokens of the modified text corpus, whether they are single words present in the original text corpus or tokens created by the corpus modifying unit 8.

According to one embodiment, the embedding unit 10 may be a neural network based embedding such as word2vec and fastText. As discussed in the article by Gittens et. al. "Skip-Gram–Zipf+Uniform=Vector Additivity.", Proceedings of the 55th Annual Meeting of the Association for Computational Linguistics (Volume 1: Long Papers) 2017, additive compositionality property is known with skip-gram model, i.e., the embedding of a paraphrase of a set of words is similar to the sum of the embeddings of each word.

Finally, once the modified text corpus has been completely tokenized, the scoring unit 12 may be called with the embeddings as well as the list of n-gram candidates.

The scoring unit 12 will apply a scoring function to each n-gram to determine whether the embedding of an n-gram is close to the sum of the embeddings of the words which make up this n-gram. The Applicant has tested several scoring functions, which depend in part on the number n of the n-grams.

In the case where n is equal to 2, the simplest approach is to compare the distance between them. So, taking the example of FIG. 1, a distance such as the cosine distance or Euclidian distance may be calculated between the embedding of «Fast food» and the sum of the embeddings of respectively «Fast» and «Food».

The Applicant has discovered another formula which may be particularly useful when detecting n-grams including stop words. This formula can be summed up as follows, for an n-gram AB composed of words A and B:

$$\text{Score}(AB)=\text{Max}(\text{Distance}(\text{Embedding}(AB),\text{Embedding}(A)+\text{Embedding}(B)),\text{Distance}(\text{Embedding}(AB),\text{Embedding}(A)),\text{Distance}(\text{Embedding}(AB),\text{Embedding}(B)))$$

In the case where n is equal to 3, the «naïve» formula may be used. That is, for an n-gram ABC composed of words A, B and C:

$$\text{Score}(ABC)=\text{Distance}(\text{Embedding}(A\_B\_C),\text{Embedding}(A)+\text{Embedding}(B)+\text{Embedding}(C))$$

This formula is able to capture official names such as red_roof inn (hotel), hilton_grand_vacations (hotel), gmbh_co_kg (company) since the meaning of a trigram is quite different from each individual word that consists of the trigram.

The idea behind the second formula of the case where n is equal to 2 may be extended too:

$$\text{Score}(ABC)=\text{Max}(\text{Distance}(\text{Embedding}(A\_B\_C),\text{Embedding}(A\_B)+\text{Embedding}(C));\text{Distance}(\text{Embedding}(A\_B\_C),\text{Embedding}(A)+\text{Embedding}(B\_C)))$$

This formula will treat the above trigrams as less important phrases because the set of individual words (a unigram and a bigram) is used in similar context. For example, Hilton and grand_vacations also refer to a hotel, and therefore Hilton_grand_vacations is considered as a paraphrase of the set of its individual words.

On the other hand, this formula allows to capture, for example, full_length_mirror and safety_deposit_box. The naïve formula would not be adapted to capture them because it supposes that the trigram simply paraphrases an object of its individual word (mirror, box) although the trigram carries specific meaning.

For the cases where n is more than 3, the formulas for n equal to 3 will be easily extended.

After the scores have been calculated for all of the n-gram candidates, the scoring unit 12 may return a list of detected phrases by keeping the n-grams with the highest scores.

This list may thereafter be added to a corpus of search engine phrases in order to improve the quality of the queries. Indeed, when a user later inputs one of the n-grams returned by the scoring unit 12 as a search term, the search engine will be able to provide more meaningful returns.

The invention claimed is:

1. A computer implemented method for improving a search engine comprising:
   a. receiving a text corpus;
   b. determining a list of n-gram candidates, each being a series of consecutive words of said text corpus, a number of said consecutive words within said series being an integer n superior or equal to two;
   c. modifying at least partially said text corpus based on said list of n-gram candidates;
   d. performing a machine learning embedding on the text corpus at least partially modified in step c;
   e. for each element in said list of n-gram candidates, computing a score based on the embedding of said element and the embeddings of the words making up said element; and
   f. adding one or more of the n-gram candidates to a search engine queries items list based on their respective scores,
   wherein step c further includes:
   parsing the text corpus with a list of n-gram candidates of step b, and each time a series of consecutive words of said text corpus make up a given element of said list of n-gram candidates, determining whether one or more words consecutive to said series of consecutive words of said text corpus make up a different element of said list of n-gram candidates with one or more of endmost words of said series of consecutive words of said text corpus, and, in such case, using a pseudo-random function parametrized by a number of times the series of words making up said given element has already been replaced by a token associated with a corresponding given element within the part of the text corpus already parsed to compute a value determining whether the series of consecutive words making up said given element should be tokenized as a single word token or not, and applying same processing to the series of consecutive words making up said different element.

2. The computer implemented method according to claim 1, wherein each time a series of consecutive words of said text corpus make up a given element of said list of n-gram candidates, replacing said series of consecutive words by a token associated with a corresponding given element.

3. The computer implemented method according to claim 2, wherein step c further includes, upon identifying a series of consecutive words of said text corpus making up a given element of said list of n-gram candidates, determining whether one or more words consecutive to said series of consecutive words of said text corpus make up a different element of said list of n-gram candidates with one or more of endmost words of said series of consecutive words of said text corpus, and, in such case, duplicating the series of consecutive words making up said different element and replacing said series of consecutive words by a token associated with said different element.

4. The computer implemented method according to claim 1, wherein step c includes copying the text corpus such that each word of the text corpus appears a number of times equal to the number of said consecutive words within said series being an integer n superior or equal to two, and parsing each copy of the text corpus by analyzing each sentence by series of consecutive words which number is the integer n superior or equal to two, each sentence of a copy being parsed with an offset, the offset being different for each copy.

5. The computer implemented method according to claim 1, wherein step e includes computing cosine distance or Euclidian distance between the embedding of said element and the embeddings of the words making up said element.

6. The computer implemented method according to claim 1, wherein the number of said consecutive words within said series is equal to two, and step e includes computing a maximum of a distance between the embedding of said element and a sum of the embeddings of the words making up a given element, and the distance between the embedding of said element and each separate embedding of the words making up said element.

7. The computer implemented method according to claim 1, wherein the number of said consecutive words within said series is equal to three, and step e includes computing a maximum of a distance between the embedding of said element and a sum of embedding of two consecutive words of the words making up a given element and embedding of remaining word making up said element.

8. The computer implemented method according to claim 1, wherein step b includes using pointwise mutual information between words.

9. A non-transitory computer readable medium having stored thereon a computer program comprising instructions for performing a method for improving a search engine, the method comprising:
a. receiving a text corpus;
b. determining a list of n-gram candidates, each being a series of consecutive words of said text corpus, a number of said consecutive words within said series being an integer n superior or equal to two;
c. modifying at least partially said text corpus based on said list of n-gram candidates;
d. performing a machine learning embedding on the text corpus at least partially modified in step c;

e. for each element in said list of n-gram candidates, computing a score based on the embedding of said element and the embeddings of the words making up said element; and
f. adding one or more of the n-gram candidates to a search engine queries items list based on their respective scores,
wherein step c includes parsing the text corpus with a list of n-gram candidates of step b, and each time a series of consecutive words of said text corpus make up a given element of said list of n-gram candidates, determining whether one or more words consecutive to said series of consecutive words of said text corpus make up a different element of said list of n-gram candidates with one or more of endmost words of said series of consecutive words of said text corpus, and, in such case, using a pseudo-random function parametrized by a number of times the series of words making up said given element has already been replaced by a token associated with a corresponding given element within the part of the text corpus already parsed to compute a value determining whether the series of consecutive words making up said given element should be tokenized as a single word token or not, and applying the same processing to the series of consecutive words making up said different element.

10. A computer system, comprising:
a processor coupled to a memory, the memory having recorded thereon a program comprising instructions for improving a search engine that when executed by the processor causes the processor to be configured to:
a. receive a text corpus,
b. determine a list of n-gram candidates, each being a series of consecutive words of said text corpus, a number of said consecutive words within said series being an integer n superior or equal to two,
c. modify at least partially said text corpus based on said list of n-gram candidates,
d. perform a machine learning embedding on the text corpus at least partially modified in c,
e. for each element in said list of n-gram candidates, compute a score based on the embedding of said element and the embeddings of the words making up said element, and
f. add one or more of the n-gram candidates to a search engine queries items list based on their respective scores,
wherein the processor is further configured to in c to parse the text corpus with a list of n-gram candidates of b, and each time a series of consecutive words of said text corpus make up a given element of said list of n-gram candidates, determine whether one or more words consecutive to said series of consecutive words of said text corpus make up a different element of said list of n-gram candidates with one or more of endmost words of said series of consecutive words of said text corpus, and, in such case, use a pseudo-random function parametrized by a number of times the series of words making up said given element has already been replaced by a token associated with a corresponding given element within the part of the text corpus already parsed to compute a value determining whether the series of consecutive words making up said given element should be tokenized as a single word token or not, and apply the same processing to the series of consecutive words making up said different element.

11. The computer implemented method according to claim 2, wherein the number of said consecutive words within said series is equal to two, and step e includes computing a maximum of a distance between the embedding of said element and a sum of the embeddings of the words making up said given element, and the distance between the embedding of said element and each separate embedding of the words making up said element.

12. The computer implemented method according to claim 3, wherein the number of said consecutive words within said series is equal to two, and step e includes computing a maximum of a distance between the embedding of said element and a sum of the embeddings of the words making up said given element, and the distance between the embedding of said element and each separate embedding of the words making up said element.

13. The computer implemented method according to claim 4, wherein the number of said consecutive words within said series is equal to two, and step e includes computing a maximum of a distance between the embedding of said element and a sum of the embeddings of the words making up a given element, and the distance between the embedding of said element and each separate embedding of the words making up said element.

14. The computer implemented method according to claim 2, wherein the number of said consecutive words within said series is equal to three, and step e includes computing a maximum of a distance between the embedding of said element and a sum of embedding of two consecutive words of the words making up said given element and embedding of remaining word making up said element.

15. The computer implemented method according to claim 3, wherein the number of said consecutive words within said series is equal to three, and step e includes computing a maximum of a distance between the embedding of said element and a sum of embedding of two consecutive words of the words making up said given element and embedding of remaining word making up said element.

16. The computer implemented method according to claim 4, wherein the number of said consecutive words within said series is equal to three, and step e includes computing a maximum of a distance between the embedding of said element and a sum of embedding of two consecutive words of the words making up a given element and embedding of remaining word making up said element.

\* \* \* \* \*